United States Patent
Moore (10) Patent No.: US 6,370,454 B1
(45) Date of Patent: Apr. 9, 2002

(54) APPARATUS AND METHOD FOR MONITORING AND MAINTAINING MECHANIZED EQUIPMENT

(75) Inventor: James T. Moore, Richmond, VA (US)

(73) Assignee: Edwin S. Moore III, Philadelphia, PA (US)

( * ) Notice: Subject to any disclaimer, the term of this patent is extended or adjusted under 35 U.S.C. 154(b) by 0 days.

(21) Appl. No.: 09/512,760

(22) Filed: Feb. 25, 2000

(51) Int. Cl.[7] .......................... G06F 17/40; G06F 15/20
(52) U.S. Cl. .............................. 701/29; 701/30; 701/33; 340/438
(58) Field of Search .............................. 701/29, 30, 34, 701/33; 340/438, 457.4, 459, 989; 73/116, 117.2, 117.3

(56) References Cited

U.S. PATENT DOCUMENTS

| | | | | |
|---|---|---|---|---|
| 4,404,639 A | * | 9/1983 | McGuire et al. ............. 364/551 |
| 4,677,429 A | * | 6/1987 | Glotzbach ................... 340/711 |
| 4,839,811 A | * | 6/1989 | Kanegae et al. ....... 364/424.03 |
| 4,850,396 A | * | 7/1989 | McClish et al. ............. 138/103 |
| 4,989,146 A | * | 1/1991 | Imajo ..................... 364/424.04 |
| 5,541,840 A | * | 7/1996 | Gurne et al. ........... 364/424.03 |
| 5,606,311 A | * | 2/1997 | Polidan et al. ............... 340/607 |
| 5,794,164 A | * | 8/1998 | Beckert et al. ................. 701/1 |
| 5,808,907 A | * | 9/1998 | Shetty et al. ........... 364/551.02 |
| 5,917,408 A | * | 6/1999 | Cardillo et al. .............. 340/439 |
| 5,922,037 A | * | 7/1999 | Potts ............................ 701/29 |
| 5,931,878 A | * | 8/1999 | Chapin, Jr. ................... 701/30 |
| 6,003,808 A | * | 12/1999 | Nguyen et al. ............. 244/1 R |
| 6,052,631 A | * | 4/2000 | Busch et al. ................... 701/29 |
| 6,085,132 A | * | 7/2000 | Ishii et al. ..................... 701/29 |
| 6,094,609 A | * | 7/2000 | Arjomand ..................... 701/29 |
| 6,148,179 A | * | 11/2000 | Wright et al. ................. 455/66 |
| 6,246,320 B1 | * | 6/2001 | Monroe ....................... 340/506 |

\* cited by examiner

Primary Examiner—Tan Nguyen
Assistant Examiner—Dalena Tran (57) ABSTRACT

A method and apparatus for the maintenance of mechanized equipment such as an automobile is disclosed. Various sensors located within the automobile provide information to an on-board computing device, a personal digital assistant, or a local computing device which are networkable to a network such as the Internet. The information may be transferred across the network, and service obtained appropriately. Information located in various remote servers relating to the performance and service of the vehicle may be downloaded across the network and easily used in servicing and maintaining the vehicle. Optionally, the apparatus includes a notification system, such as an email system, for notifying of, scheduling, and/or paying for services.

32 Claims, 7 Drawing Sheets

```
┌─────────────────────────────────────────────┐
│         VEHICLE PROBLEM SCREEN          ☒  │
├─────────────────────────────────────────────┤
│ ELECTRICAL SYSTEM FAULT                     │
│      ○ - LOW CURRENT WARNING                │
│      ○ - TAILLAMP NEEDS REPLACEMENT         │
│   [REMIND]    [SERVICE]     [FIX IT]        │
├─────────────────────────────────────────────┤
│ VEHICLE ALERT SCREEN                        │
│                                             │
│ ODOMETER    49,550.2                        │
│     SCHEDULED MAINTENANCE DUE               │
│        - OIL CHANGE                         │
│        - TIRE ROTATION                      │
│        - TRANSMISSION FLUID                 │
│   [REMIND]    [SERVICE]     [FIX IT]        │
│                                             │
│ SUSPENSION SYSTEM                           │
│     LOW PRESSURE RIGHT FRONT TIRE           │
│        - 28 PSI                             │
│   [REMIND]    [SERVICE]     [FIX IT]        │
├──────┬─────────────┬─────────┬──────────────┤
│ MORE │ SERVICE ALL │ REFRESH │ UPLOAD       │
└──────┴─────────────┴─────────┴──────────────┘
```

| VEHICLE STATUS SCREEN | ☒ |
|---|---|
| COOLING SYSTEM STATUS | ● WITHIN SPECIFICATIONS <br> ○ PROBLEM |
| IGNITION SYSTEM STATUS | ● WITHIN SPECIFICATIONS <br> ○ PROBLEM |
| FUEL SYSTEM STATUS | ● WITHIN SPECIFICATIONS <br> ○ PROBLEM |
| ELECTRICAL SYSTEM STATUS | ○ WITHIN SPECIFICATIONS <br> ● PROBLEM |
| HYDRAULIC SYSTEM STATUS | ● WITHIN SPECIFICATIONS <br> ○ PROBLEM |

| MORE | PROBLEMS | ALERTS | UPDATE | BACK |

APPARATUS AND METHOD FOR MONITORING AND MAINTAINING MECHANIZED EQUIPMENT

BACKGROUND OF THE INVENTION

1. Field of the Invention

The present invention relates to an automated data recording, display, reminder, and scheduling system for performing routine scheduled maintenance on a motorized or mechanized vehicle or equipment or a fleet of vehicles or of equipment. More particularly, the invention in an embodiment relates to a software-enabled system for tracking automobile information, including operating system statuses as reported by a plurality of sensors, mileage, computed fuel economy, maintenance, costs, and repair utilizing a communications link between the vehicle and a computing device. The invention includes a method and apparatus for printing out various advertisements, coupons, or other material to attract a driver to a service station or location for service to be provided. The invention further contemplates an automated diagnosis system for detecting and reporting problems with system functioning, and alerts for potential problems. The apparatus also is configurable with a schedule program which can determine the location, timing, types, and availability of services by an optional link to a database such as the Internet.

2. Description of the Related Art

It is known to provide a driver with updated traffic and other information while driving. See, e.g. U.S. Pat. No. 5,131,020 issued to Liebesny et al. Jul. 14, 1992.

It is also known to provide a personal computing device inside a vehicle, e.g. the Q-PC Real Car Computer, available from Q-PC, Inc, PO Box 1368, Madison, Ala., 35758.

It is also known to provide a personal communications system which can call for emergency roadside service at the push of a button. See, e.g. U.S. Pat. No. 5,797,09 issued to Clise et al. Aug. 18, 1998.

It is also known to provide personal digital assistants for downloading information and displaying the information to a user, such as the Palm™ Series of personal digital computers available from 3COM, Inc., 5400 Bayfront Plaza, Santa Clara, Calif. 95052, and other digital assistants.

Finally, it is known to provide a hookup for engine diagnostics within an automobile to determine the functioning of an engine by looking at its control module. Such hookups were available as early as 1988 on such automobiles as the Chevrolet Beretta™, a General Motors product.

However, none of these known technologies provides a proactive method for maintaining an engine on a vehicle, piece or equipment, or automobile and keeping detailed records relating to that automobile. Maintenance delay is one of the chief reasons for automotive failure, and adequate maintenance of an automobile will sometimes help prevent failure or diminution of value. Furthermore, scheduling an appointment and finding suitable service can be inconvenient, thus delaying required service. Additionally, it has been difficult for the average person to obtain a complete diagnostic on an automobile in the convenience of a home garage setting to allow a do-it-yourselfer to save money instead of hiring a professional mechanic. A solution to this problem is needed, especially as mechanized equipment and vehicles get more and more complex.

SUMMARY OF THE INVENTION

An object of the present invention is to provide a method and apparatus for receiving information from both a user and an automobile, piece of equipment, etc. and constructing a service record based upon that information.

An additional object of the present invention is to provide an advance warning system of impending problems relating to the functioning of the equipment or automobile whereby a driver may be forewarned of potentially damaging problems with the automobile or equipment.

A further object of the present invention is to provide a convenient cost analysis of the maintenance and overall functioning of an automobile or piece of equipment to a user.

Yet another object of the present invention is to provide an apparatus which is easily portable and has connectivity to both a user and a networkable computer to provide information relating to an automobile to a user.

An additional object of the instant invention is to provide a customized maintenance schedule for an automobile based upon a driver's driving habits, geographical location, and the climate under which most of the driving is done, including seasonal variations.

A further object of the present invention is to provide a user with an inexpensive diagnostic tool which an operator of a piece of mechanized equipment may use to determine operating status and perform preventative maintenance.

An additional object of the instant invention is to provide a user with a convenient method of scheduling maintenance and making appointments with local service providers to service equipment.

Yet another object of the instant invention is to provide a link between a motorized piece of equipment and a networked or networkable database including such information as approved parts, fluids, maintenance schedules, and other vehicle specifications.

These and other objects will become readily apparent to one of skill in the art having regard for this disclosure.

To achieve these objectives in accordance with the present invention, the present invention provides both a software and a hardware solution to maintaining an automobile or other equipment in accordance with a prescribed maintenance program.

Although the present invention is described most specifically with reference to an automobile and its various systems, it may be applied to various mechanized equipment—including but not limited to industrial machinery, heavy equipment, trucks, military vehicles, ships, airplanes, heavy tools and fabrication equipment, and production equipment. Virtually any machine which is maintained and has operating parameters which can be measured by sensors can be improved by the addition of an apparatus according to the present invention.

As is well known, maintenance is routinely required for the proper functioning of an automobile or other motorized or mechanized equipment. For example, the oil must be routinely changed, transmission fluid and engine coolant monitored and replaced or changed, and the tires maintained at an appropriate pressure. Gasoline must occasionally be added to the tank to keep the engine running, and periodic tune-ups, sensor replacement, vacuum hose replacement, and air conditioning service must be undertaken to prevent a failure of the various operating systems of an automobile or other mechanical device.

The average driver is generally without sufficient knowledge as to all of the prescribed maintenance rituals which must be performed on an automobile, or the various settings, fluid levels, and adjustments which should be made to obtain optimized performance of the vehicle.

Depending on the make, model, and various optional features of an automobile or other piece of equipment, differing types of fuel, coolant, oil, and lubrication ate applied in various locations about the automobile or piece of equipment.

Unfortunately, most problems arise with automobiles while they are on the road, or indications of trouble arise while in the car, far from convenient information sources or means for repairing the automobile or scheduling service or making notes. Likewise, a piece of construction equipment may be located at a distant construction site, and obtaining service may be difficult. This can lead to lost productivity, of both the driver and the equipment, if, by way of example, the equipment is urgently needed for a construction project.

DETAILED DESCRIPTION OF THE PRESENTLY PREFERRED EMBODIMENT

A. Sensor Array Configuration

Figure 1:
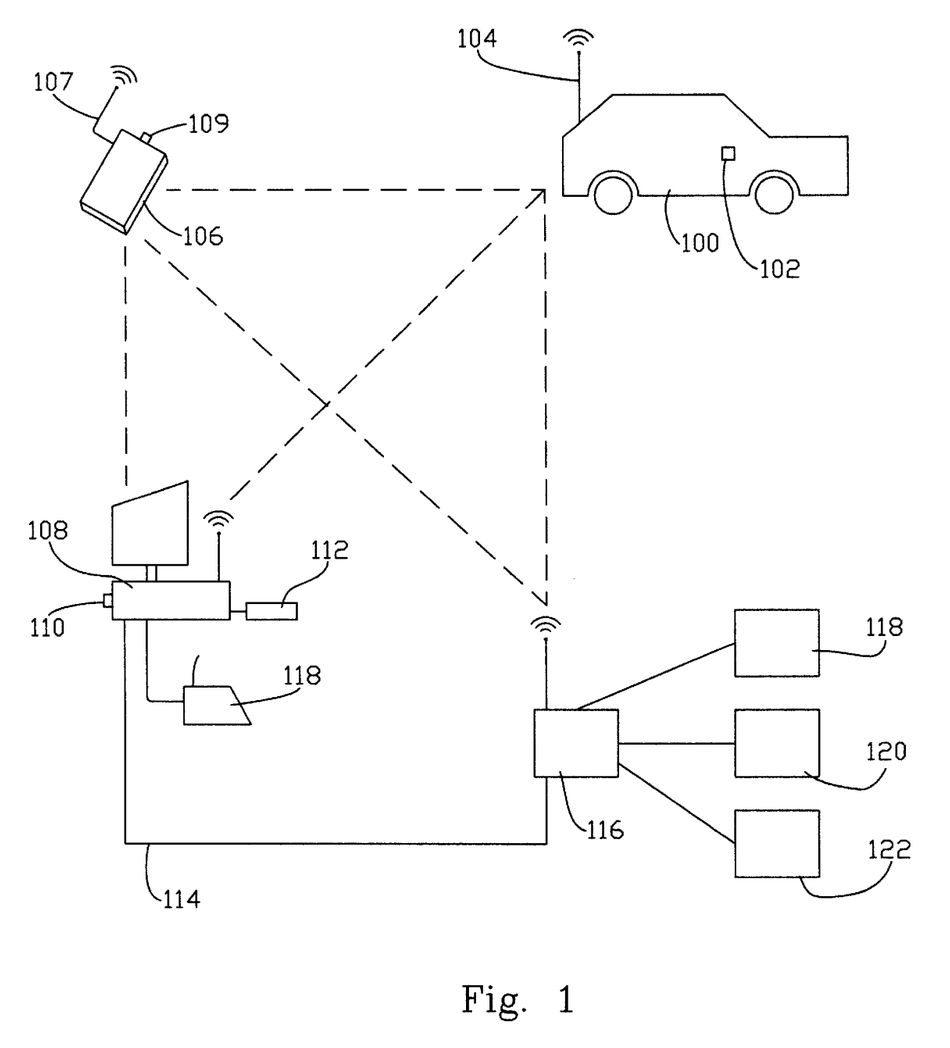
FIG. 1 is a schematic diagram of an exemplary apparatus according to the instant invention.

As shown in FIG. 1, an automobile 10 is illustrated. An automobile consists of various mechanical, electrical, hydraulic, vacuum, and other systems which each contribute to its functioning.

The engine, which is traditionally gasoline or diesel powered, acts to ignite the fuel and drive pistons, which are then linked to a transmission which sends the generated power to a drivetrain including wheels, axles, or the like.

The engine may be air cooled, water cooled, or cooled by virtue of any other known means. If it is air cooled, temperature fluctuations within the engine block may occur gradually and the engine itself may run at a higher temperature. If, for example, the engine is a ceramic-metal (cermet) composite containing engine, temperatures may be much higher than for an average automobile.

Regardless of the nominal operating temperature of the engine, there ate usually clear parameters between which engine performance is optimal. For a conventional water/ antifreeze mixture cooled engine, such temperature is usually between 100 and 180 degrees F. A certain minimum flow of coolant is required to dissipate heat built up by combustion.

Thus, for at least the water/antifreeze cooling system, several parameters are measurable and provide valuable information regarding an automobile's performance. They may include, but are not limited to, coolant level, coolant temperature, water/antifreeze mixture (frequently measured by specific gravity), cooling system pressure, and coolant flow. For sir cooled engines or the like, and optionally for water cooled engines, block temperature may be measured. Each of these parameters are measured according to fairly standard techniques—temperature sensors for the coolant are known, coolant level sensors are known, flow meters are known, pressure sensors are known, and specific gravity testers are also known.

Figure 2A:
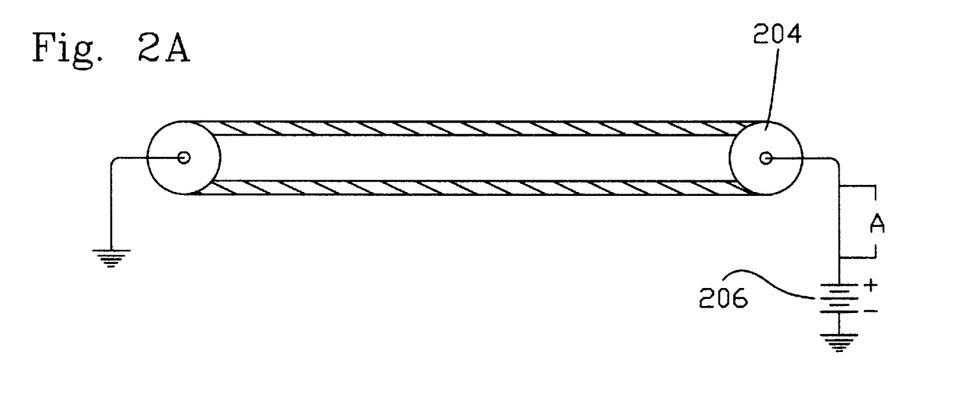
FIG. 2A is a cross-sectional and schematic representation of an embodiment of a novel sensor according to the present invention.
Figure 2B:
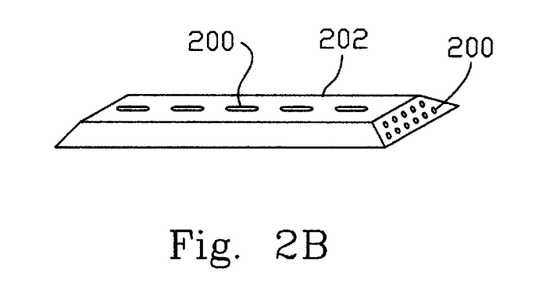
FIG. 2B is a perspective view of a novel sensing material according to the present invention.

Novel belt and hose wear sensors are also contemplated by this invention. Belts and hoses are exposed to some of the most extreme operating conditions to be found in a vehicle or piece of equipment. Over time, they degrade. This degradation is sometimes visible from the exterior of the hose, e.g. bulging in places or obvious external wear. However, internal degradation is virtually undetectable without removing the hose and visually inspecting the interior and flexing it to check for soundness. A novel sensor arrangement according to the present invention is seen in FIGS. 2A and 2B.

In the novel wear sensors according to the present invention, a conductive material 200 is incorporated into the structural support of the belt or hose. The conductive material is flexible and has a certain set resistance, by virtue of the many parallel paths which electrical current may travel through. Over time, as the hose or belt material degrades, the conductive material will be interrupted in places within the belt or hose, causing a measurable increase in the electrical resistivity through the belt.

At least some of the conductive material 200 is exposed on a, exterior surface 202 of the belt or hose which is in electrical connectivity with at least two engine component surfaces, e.g. a wheel 204 or a pipe fitting which is electrically conductive. Current or a charge differential may be applied by placing a charge to one pipe end and measuring the flow to the other pipe end through the circuit formed by the hose. For the belt, similar charge may be applied to a driving wheel or an idler wheel, and the current flow be measured across the belt by an ammeter A. This is accomplished by connecting the wheel or pipe electrically with a voltage source 206.

With such sensors appropriately placed within an automobile, they can deliver an astounding array of information relating to the functioning of the cooling system. With such information, various alerts and service recommendation may be made to a user who otherwise might be blissfully ignorant of a brewing problem until the "engine" light comes on or the motor stops running.

The term sensor, as used herein, is meant to be construed broadly, including but not limited to pressure sensors, temperature sensors, viscosity sensors, flow sensors, chemical sensors such as oxygen, $CO_2$, CO, NO, $NO_2$, uncombusted hydrocarbons, sulfur and other sensors which detect various chemical substances.

The term vehicle operating system or equipment operating system, as used herein, is meant to be construed broadly, including but not limited to electrical system, ignition system, security system, control system, onboard computer system, pneumatic system, vacuum system, lubrication system(s), cooling/heating system(s), air conditioning system, on-board entertainment system, including radio receivers, tape players, disc players, television receivers, and mobile communications links, braking system, suspension system, lighting system, gauge and display systems, other sensors including radar detectors, GPS devices, IR imaging devices, motion sensors and object sensors.

Various computer devices may be attached to an automobile and interrogated by a system according to the instant invention to determine their operating status.

Figure 7:
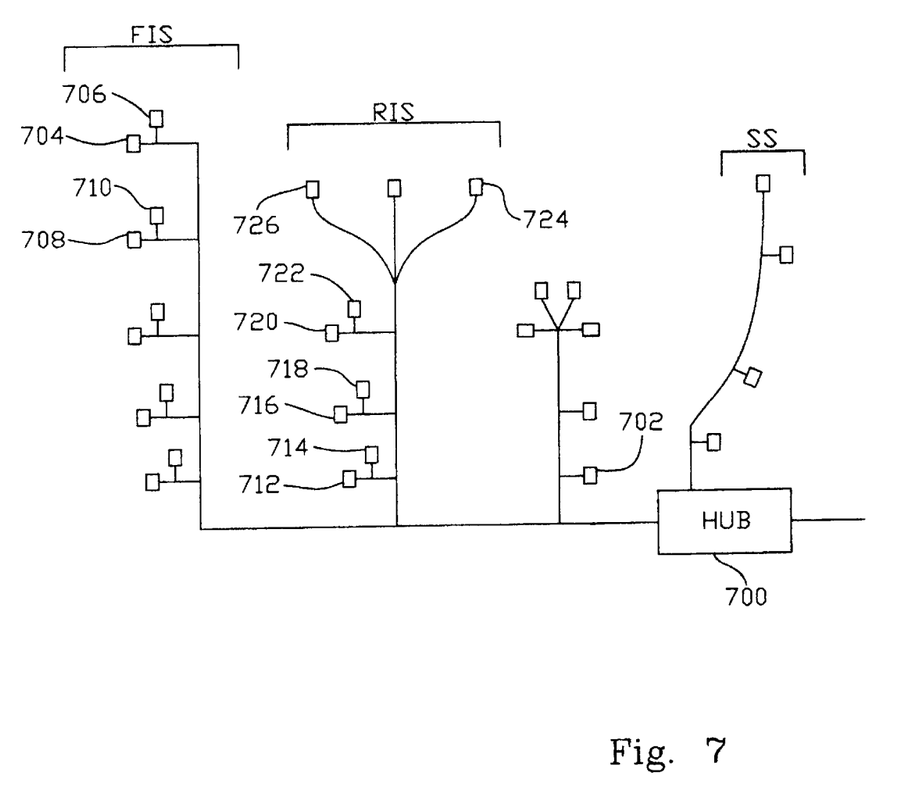
FIG. 7. Is a schematic representation of an exemplary vehicle intranet including a hub and sensor arrangement.

With a sensor array such as the above for the cooling system, a comprehensive analysis of the overall system function can be accomplished by merely applying a logic tree when an out of specification reading occurs on any of the sensors above.

data before the engine start sequence is initiated. The intranet server is connected to a network of a plurality of sensors 702 which extend throughout the vehicle. Each sensor is given a unique IP address within the intranet, and that IP address enables it to send information through the local intranet to the intranet server utilizing the same lines as the several other sensors in the local intranet. In this manner the amount of extra wiring which is otherwise required for a direct hardwired connection to each sensor is dramatically reduced.

TABLE I

DATA GENERATED BY EXEMPLARY COOLING SYSTEM SENSOR ARRAY

| Sensor Type | Data Supplied | Possible Diagnosis | Proposed Solution(s) |
|---|---|---|---|
| Level Sensor<br>a) in cooling system<br>b) in reservoir | Level of coolant in cooling system and level of coolant in the overflow tank | 1) leak in cooling system,<br>2) evaporation of coolant from overflow tank | 1) refill and monitor<br>2) inspect system for leaks<br>3) pressure test system for leaks |
| Temperature sensor<br>a) in cooling system<br>b) in heater core loop | Temperature of the coolant circulating through the cooling system | 1) thermostat malfunction<br>2) coolant level low<br>3) engine lubrication problem | 1) check coolant level<br>2) check thermostat function |
| Pressure Sensor<br>a) after water pump<br>b) in radiator | Pressure of the coolant circulating through the cooling system. | 1) a or b - Low - possible system leak<br>2) a or b - possible obstruction in cooling system | 1) check coolant level<br>2) check system for leaks<br>3) check thermostat function<br>4) check colant flow<br>5) flush and refill coolant system |
| Flow Sensor in cooling system | Rate of flow of coolant through the cooling system | 1) Possible obstruction in coolant system<br>2) possible water pump failure<br>3) possible system leak | 1) check system pressure<br>2) check system for leaks<br>3) flush and refill system<br>4) check water pump |
| Temperature Sensor in Engine Block | Temperature of the block and mechanical parts | 1) possible loss of coolant<br>2) possible loss of coolant flow<br>3) possible thermostat malfunction | 1) check coolant level<br>2) check flow sensor<br>3) check thermostat |
| Specific Gravity meter | specific gravity of the coolant | 1) degradation of coolant over time | 1) flush and refill cooling system |
| Belt Wear Sensor | degradation of belt or chain | 1) potential breakage | 1) replace belt or chain |
| Hose Wear Sensor | degradation of cooling system hose | 1) potential hose burst imminent | 1) replace affected hose |

B. The Sensor Reporting Structure

The various sensors of the present invention, if fully implemented within a piece of equipment or an automobile, could fairly be said to make the equipment bristle with sensors. As a piece of equipment increases in value, the cost-benefit for adding different levels of sensing ability will dictate the appropriate sensing levels. However, as sensors are now relatively inexpensive, they can be mounted virtually anywhere in an automobile or piece of equipment.

The sensors may each be hard wired in place with individual connections into a sensor reporting module which received the analog or digital data from the sensor sending unit and converts it into useable data for the apparatus according to the instant invention.

An especially preferred embodiment of the present invention is illustrated in FIG. 7. Hub 700 is a local intranet server device capable of a cold boot and minimal startup time which acts as a server data receiver The intranet server is dc powered and preferably initializes as soon as the ignition switch is moved from the "off" position, to begin recording The sensors located in various portions of the automobile may be preferably linked in one branch of the local intranet. The forward illumination section "FIS" of the intranet includes sensors which detect resistance and/or current flow through the forward illumination portion of the equipment or automobile. Headlamps may be located at sensors 704 and 708, while high beams associated with the headlamps may be located at 706 and 710.

In this manner sensors may conveniently be placed throughout the automobile. Rear illumination section "RIS" of the intranet may include the taillights 712, 714, turn signals 716, 718, marker lights 720, 722, and license plate illumination 724. The sections need not be absolute, for example exhaust pipe temperature sensor 726 may be included on the RIS section merely because it is close to the wiring which lead back to the hub 700.

The sensors preferably send their information back to the hub 700 using a TCP/IP protocol, preferably using a time division multiple access (TDMA) or code division multiple access (CDMA) protocol which identifies the source of the data and routes it accordingly. TDMA allows certain sensors to send data along the line in time-synchronized segments, while CDMA allows each to encode information using orthogonal code sequences which do not interfere with each other while being transmitted.

Suspension section 'SS' may contain sensors relating to tire pressure, shock/strut pressure, and vehicle load, trim and leveling information. If, for example a load in a truck is seriously imbalanced, the sensors can warn the operator to adjust the load, or allow an active suspension to compensate by pumping up the shocks in the more heavily loaded section to improve tide and/or handling characteristics.

C. The Data Software Module

Controlling the information flow is a very useful feature of the present invention. Suitable software receives the data input from each of the sensors within the various operating systems of the equipment or vehicle. Real-time performance of an engine may be monitored by taking data as it is received from the vehicle.

Figure 3:
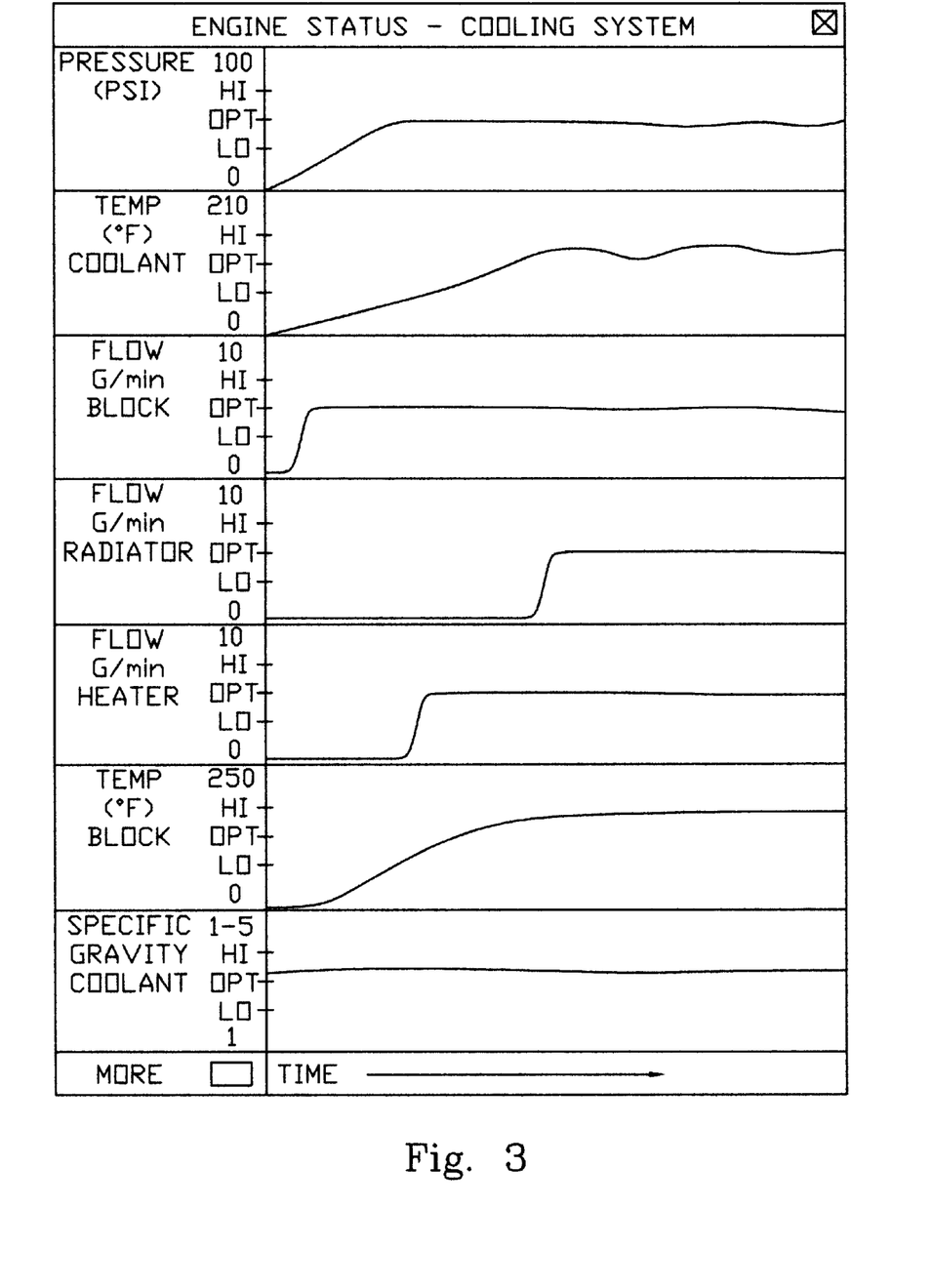
FIG. 3 is a representation of an exemplary computer interface screen showing status according to an embodiment of the present invention.

FIG. 3 illustrates a display screen useful in displaying data according to the instant invention. More fields of data may be observed by clicking on the 'more' button in the window. These display screens may be organized in any way by a person of skill in the art having regard for this disclosure, and are not limited to the organizational structures depicted therein.

In a preferred embodiment of the invention, each sensor is included in a group of sensors which give information relating to a single onboard system of the equipment or vehicle. This group of sensors may be an electronic grouping, not necessarily a physical grouping, thus allowing sensors which help diagnose one system also to serve double duty when querying another, related system.

For example, if the tailpipe sensor is detecting an overheated tailpipe or an excess of uncombusted hydrocarbon emissions, the control software may poll the ignition module to make sure each spark plug is firing, and check the timing thereof. If the vehicle stalls, the software can query the fuel line sensor or access historical data relating to the fuel flow sensor to see if the flow of fuel has been interrupted, or if the engine oil pressure has been low recently.

The software is programmed with appropriate heuristic algorithms to analyze sensor data and suggest possible problems or remedies. This information can be of extreme value in a situation where the driver or operator is unfamiliar with automobile maintenance, by suggesting the most likely sources and fixes for a problem. If service is required by a professional, the software can give the driver a fairly good indicator of the problem and in a preferred embodiment even predict the tough cost of repairs.

Figure 4:
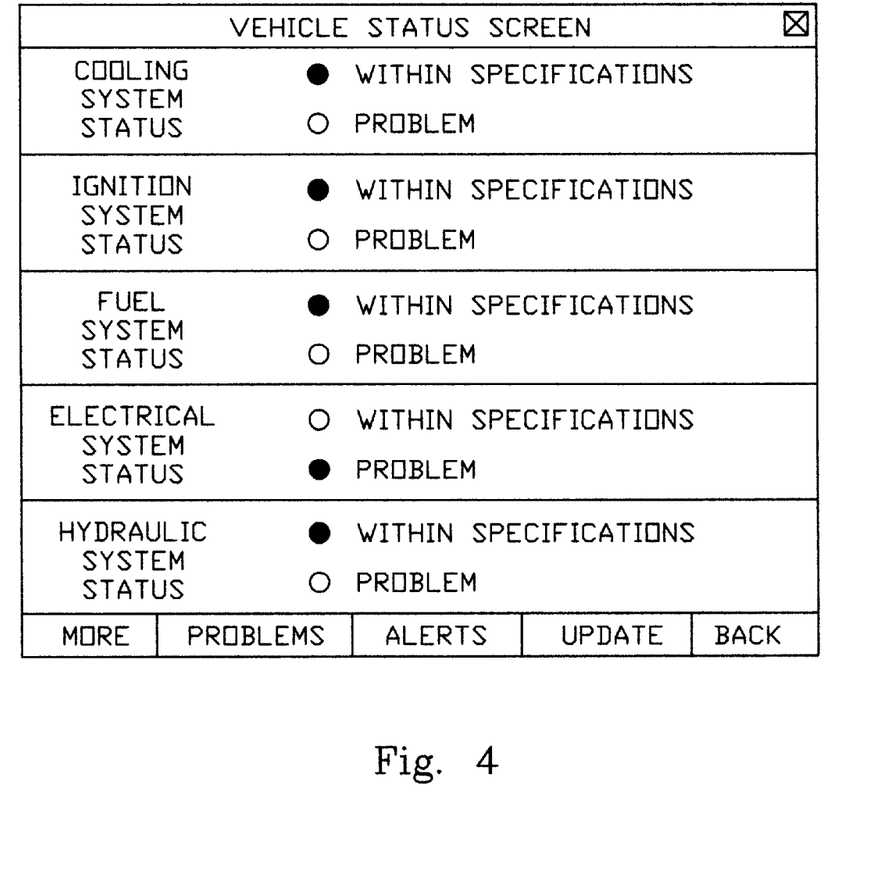
FIG. 4 is a representation of an exemplary computer interface screen showing status summary according to the present invention.

Turning now to FIG. 4, an exemplary Vehicle Status Screen display is shown. The display screens can be adjusted to any level of vehicle maintenance ability. In this particular instance, the status screen displays a summary of the information available in multiple screens similar to those of FIG. 3. In this instance, the Electrical system status indicates a problem by flashing an indicator on the control screen. The control screen is preferably touch sensitive and is either mounted in the vehicle or is detachable as in a personal digital assistant.

Figure 5:
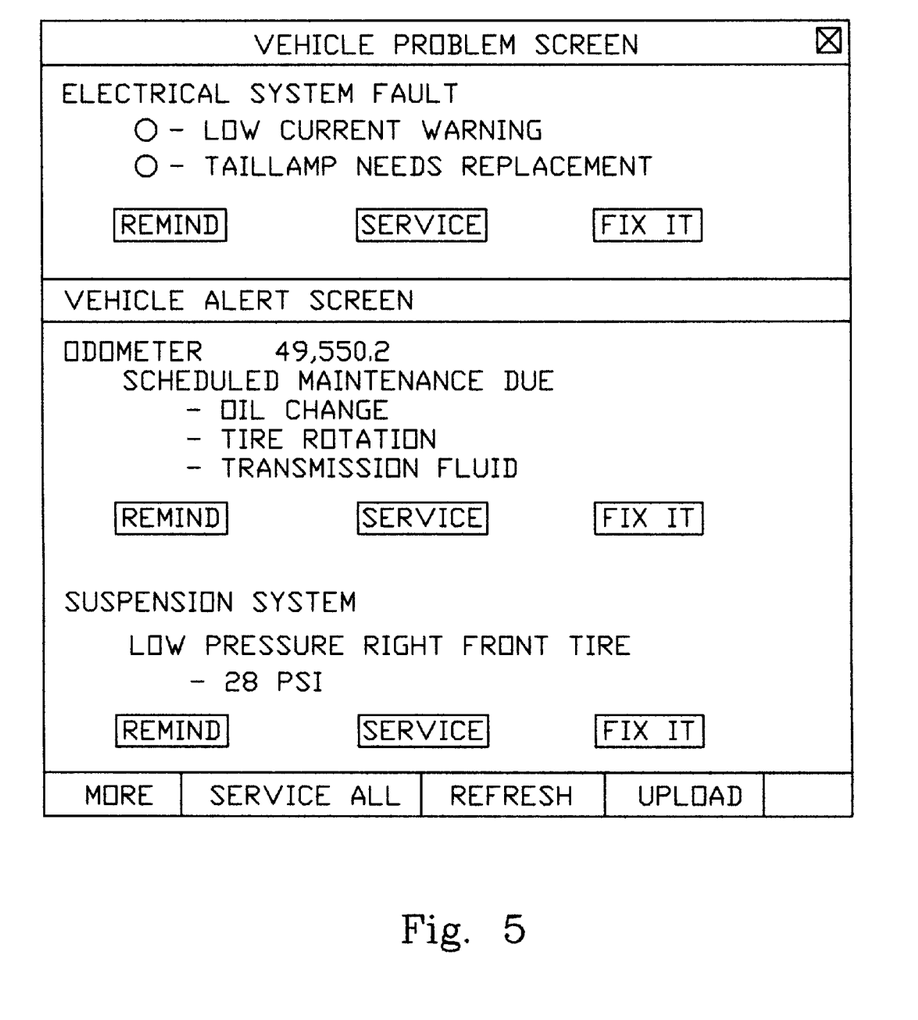
FIG. 5 is a representation of an exemplary computer interface screen showing problem and alert summary details.
Figure 6:
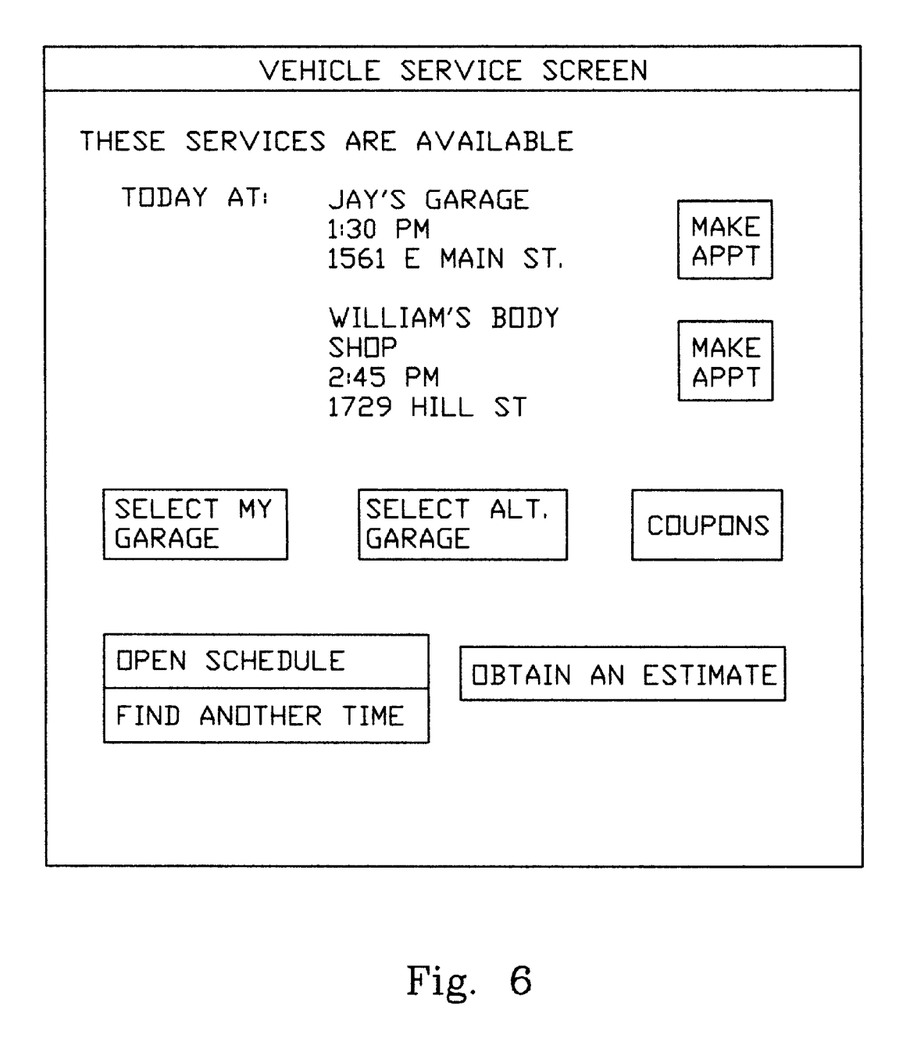
FIG. 6 is a representation of an exemplary computer interface screen showing service scheduling options.

By clicking on or pressing on the problems icon or button at the screen bottom, or pressing on the problem indicator on the screen, the user is directed to a screen as illustrated in FIG. 5. The nature of the electrical system problem is indicated as "low current warning". Clicking on the low current warning will reveal the underlying data.

TABLE II

EXEMPLARY WARNING DATASTREAM

Message from 720.23.113 Resistance/Current Sensor
700.1.1 7.23.113 Resistance Value error 1/0 04:34:55.1 GMT 01/02/2000

This datastream is preceded by 700.1.1—the address for the hub, followed by 7 (the indicator for the aft intranet branch), 23 (the indicator for the RIS branch) and 113, the specific location of the right-hand rear taillight lamp. The time and date of fault detection is also indicated.

Various means of addressing the sensors may be utilized as are known by those of skill in the art.

D. Networked Information Store

Returning now to FIG. 1, an more detailed description of the information acquisition features of the instant invention follows.

The automobile or other piece of mechanized equipment 100 may be provided with a data port 102 or radio, it, or other data link 104. A personal digital assistant (PDA) or other computing device 106 either plugs into the data port 102 or communicates through the wireless data link 104 by its own wireless link 107 or dataport 109. Realtime data may be displayed on the screen of the PDA or other computing device such as a laptop computer, and if an on-board screen for the display of information is not provided by the automobile manufacturer, the display of the PDA or other computing device may be utilized for display purposes.

The PDA or other computing device is equipped with sufficient memory to download the status information of the various operating systems of the automobile.

In an especially preferred embodiment, the PDA or the automobile directly, is linked, either through a hardwired connection (e.g. a dataport located conveniently in the garage or outside a driver's dwelling) to a local computing device 108. Even more preferred is a wireless link to the local device. Such device may be a personal computer or terminal connected to a server for the receipt of data and containing programming according to the instant invention. In another embodiment, the PDA is connectable to the stationary computing device through a corresponding data port 110.

The local computing device 108 is provided with a data entry system 112, e.g. a keyboard, mouse, microphone, voice-recognition system, scanner, joystick, touch screen, or the like, or any other data entry device, or any combination thereof. Printer 118 is optionally provided for the hard-copy download of information from the local device. The local computing device is also provided with a land line 114 or other link (including cable modem, T1 line, regular phone line, cellular connection, or the like) to an information-containing server 116.

Information-containing server 116 may be an Internet service provider, a LAN server, a home server, a WAN server, or any other type of networkable device. It, in turn is optionally connected to various other informational sources 118, 120 over a private network or a public network such as the Internet.

Information sources 118 and 120 are in a preferred embodiment servers which contain data such as manufacturer's recommended service intervals, approved types of servicing, parts, fluids, etc. Most preferably, the information is provided by the original manufacturer of the equipment or vehicle and is made available to the purchaser of the vehicle. Optionally, the apparatus according to the present invention may upload information from the vehicle or equipment to a database maintained by the original equipment manufacturer, and the suggested service recommendations may be downloaded to the local computing device.

However, the local computing device is not necessary to the complete functioning of the apparatus. The PDA 106 is provided with its own wireless link 107 which may connect directly with the vehicle link 104 and the server 116. In yet another embodiment, the vehicle itself may connect directly to the server 116 and obtain the information required directly without user intervention, and send notification of recommended service to the driver or user by any of a variety of forms of communication, e.g. e-mail, fax, or the like.

The email notification may originate from the vehicle 100, the PDA 106, the local computing device 108, the server 116, or information stores 118 and 120. In an especially preferred embodiment, the email notification includes within it an encoded meeting request for access to a computerized scheduling software.

Such software is commercially available from Microsoft Corporation, under such names Schedule™, Schedule Plus™, and Outlook™. Other scheduling programs ate available which will serve equally well. In essence, the email includes an attachment or other programming encoded which accesses the driver's or user's schedule and requests an "appointment", e.g. an appropriate time and date to bring the vehicle in for service.

In one embodiment of the present invention, the vehicle, PDA, or local computing device accesses the network (e.g. Internet) and checks with server 122, which contains information relating to the availability of vehicle maintenance services, e.g. a server for the local service station or dealer. Once availability is established, the software composes a message including optionally type of service, estimated time for repairs, cost, time and date, and requests and appointment on the driver's or user's calendar. Most preferably, the software looks in the calender first, then looks for corresponding available times for the vehicle to be serviced, then suggests the time and place.

In an especially preferred embodiment, the work is pre-authorized by an indication from the driver on the meeting request return, and additional information may be included such as credit card information, checking account information, debit card information or the like (most preferably encrypted) so that the driver merely has to drop the vehicle off for service and pick it up when the service is done. This eliminated the need for lengthy check out lines and makes it more likely that vehicles will actually make it in for routine or preventative services.

E. Optional System Enhancement

As the number of cars or mechanized equipment increases, the need for service does as well. For example, there are a multitude of tire replacement or repair facilities available, and many dealer and independent service shops to choose from. Optional to the present invention, dealers in such services may have access to the information stores in 116, 118, 120 and 122 and proactively send information to users or drivers such as upcoming sales, discounts, or the like, which the user or driver may download to the local computing device 108 and print on printing device 118.

F. Data Entry

One of the uniquely advantageous aspects of the present system includes the ability to enter data concerning the vehicle functioning at a variety of locations. First, the vehicle enters data by its various sensors, including mileage, time, system operating status, date, etc. The user can enter data her or himself by entering gallons of gas added, services performed, modifications, or events of note. The service provider may enter data through a corresponding PDA and access data entered by other sources to look up service history, which can help diagnose a problem. The manufacturer can enter data concerning changes in recommended service, product recalls, or the like.

In a preferred embodiment, the data relating to the vehicle is synchronized throughout the various locations in which it resides, e.g. the vehicle, the PDA, the local computing device, and upon the records of the service providers and manufacturer. This will help in reducing fraud in used vehicle sales, e.g. with an appropriate passcode, a prospective purchaser can see exactly the types of service a vehicle has undergone and who performed the services. The mileage can be checked to ensure odometer rollback has not occurred. In the event of a crash which destroys the on-board information store, the data is backed up at several different locations.

Furthermore, various authorities charged with inspecting motor vehicles may receive confirmation that a vehicle has been inspected in accordance with the proscribed interval by the service station sending such an indication to the appropriate authority. Manufacturers concerned with warranty issues will have a handy service record to ensure the operator has complied with recommended service intervals, and operators will have records which ensure a manufacturer will honor a warranty, instead of trying to cobble together a service history for a vehicle which may be widespread. Furthermore, consumers will no longer feel obligated to return to one particular location for service, as the records will automatically be kept in a variety of locations.

While the invention has been described in connection with the preferred embodiment, it should be understood readily that the present invention is not limited to the disclosed embodiment. Rather, the present invention is intended to cover various equivalent arrangements and is only limited by the claims which follow.

Having described the invention as above, I claim:

1. A method for the monitoring and maintenance of mechanized equipment, comprising:

providing at least one sensor for determining a characteristic state of the equipment, the at least one sensor being connectable through an intranet in said equipment to a computing device having a memory, a display, a user input device, and containing programming, said sensor sending data relating to said characteristic state, said computing device receiving said data in said memory, said computing device accessing a database relating to said data, said computing device processing said data into status information and displaying said information on the display, said computing device offering a user a menu of choices for acting upon said status information, said menu including offering scheduling for service, providing a reminder, providing cost information relating to appropriate services, providing a parts list, obtaining instructions for service or repair, or any combination thereof, said computing device receiving input from a user in response to said menu, storing said input as instructions or information, and carrying out said instructions or storing said information in memory, whereby said user is informed of the characteristic state or status of the equipment and may cause said computing device to act upon said instructions or store said information in memory.

2. A method as claimed in claim 1, wherein said sensor senses a characteristic state selected from the group consisting of pressure, temperature, fluid level, voltage, current flow, timing, mileage, time, date, wear, and emissions.

3. A method as claimed in claim 1 wherein the sensor is a belt or hose wear sensor.

4. A method as claimed in claim 3, wherein the wear sensor comprises an electrical conductor embedded in a component, said electrical conductor being connected to a source of electrical differential.

5. A method as claimed in claim 1, wherein said programming includes a local database of acceptable parameters for said characteristic state.

6. A method as claimed in claim 5, wherein said programming connects to a network and sends a message to a remote server relating to said characteristic state or status information.

7. A method as claimed in claim 6, wherein said message is an e-mail.

8. A method as claimed in claim 1, wherein said programming accesses a remote database of acceptable parameters for said characteristic state.

9. A method as claimed in claim 8, wherein said step of accessing is carried out over a network.

10. A method as claimed in claim 9, wherein the network is the Internet.

11. A method as claimed in claim 1, wherein said step of processing includes comparing said data against the database relating to said data, said database containing acceptable parameters.

12. A method as claimed in claim 11, wherein when the data is not within said acceptable parameters, displaying said data as status information on a display indicating a system problem.

13. A method as claimed in claim 1, further comprising the step of connecting said computing device to a network and receiving information from service providers relating to said characteristic state.

14. A method as claimed in claim 13, wherein said information is availability of services, cost, a printable or electronic coupon, or any combination thereof.

15. An apparatus as claimed in claim 1, wherein said characteristic is mileage, and the status information is scheduled service.

16. An apparatus as claimed in claim 1, wherein the instructions include directing the computing device to schedule an appointment for service.

17. An apparatus as claimed in claim 1, wherein the instructions include obtaining information relating to the problem from a remote information store over the network.

18. A method as claimed in claim 1, further comprising the step of making an appointment for servicing the vehicle or mechanized equipment with a service provider over said network.

19. A method as claimed in claim 18, wherein said network is the Internet.

20. A method as claimed in claim 1, wherein the sensor is a wear sensor.

21. An apparatus for the maintenance of an automobile, comprising:

at least one sensor sensing the operating condition of at least one system of said automobile and sending information relating to the operating condition as sensor data, said at least one sensor being connected to a vehicle intranet and being provided with an identifier, said vehicle intranet being connected to a local intranet hub located in the automobile and receiving said sensor data and identifier, said hub being connectable or integral with a local computing device and sending the sensor data and identifier to said local computing device, said local computing device containing programming which analyzes the sensor data and identifier and displays said sensor data as status information, said local computing device having a display for displaying said status information, an input for receiving instructions and information from a user, and being connectable to a remote information store containing information relating to said automobile, said local computing device acting further in response to instructions or information inputted by said user in response to said status information.

22. An apparatus as claimed in claim 21, wherein the displayed sensor data further comprises a displayed menu of user choices.

23. An apparatus as claimed in claim 22, wherein said menu includes the options to provide instructions to the local computing device or provide more information from said user.

24. An apparatus as claimed in claim 23, wherein said instructions are selected from the group consisting of obtain more information relating to the at least one system, obtain service information, schedule an appointment, or ignore the information.

25. An apparatus as claimed in claim 23, wherein said instructions include authorizing a service provider to perform service upon said automobile.

26. An apparatus as claimed in claim 21, wherein the remote information store includes automobile specifications, service recommendations, or manufacturer information relating to the automobile.

27. An apparatus as claimed in claim 26, wherein said manufacturer information includes a recall notification.

28. An apparatus as claimed in claim 21, wherein the status information comprises notification of a problem or an alert relating to an impending problem or routine maintenance.

29. A method for the monitoring and maintenance of mechanized equipment, comprising:

providing at least one sensor for determining a characteristic state of the equipment, the at least one sensor being connectable through an intranet in said equipment to a computing device having a memory, a display, a user input device, and containing programming, said sensor sending data relating to said characteristic state, said computing device receiving said data in said memory, said computing device accessing a database relating to said data, said computing device processing said data into status information and displaying said information on the display, said computing device offering a user a menu of choices for acting upon said status information, said computing device receiving input from a user in response to said menu, storing said input as instructions or information, and carrying out said instructions or storing said information in memory, whereby said user is informed of the characteristic state or status of the equipment and may cause said computing device to act upon said instructions by connecting to the network and scheduling an appointment, sending a scheduling request to a scheduling program, obtaining information relating to the availability of services, obtaining cost information relating to services, or any combination thereof, or store said information in memory.

30. A method as claimed in claim 29, wherein the step of offering a menu of choices includes offering the user a menu of potential diagnoses of a system problem.

31. A method as claimed in claim 29, wherein the step of offering comprises computing, using a database of data not within acceptable parameters, a range of possible problems, and displaying said problems to said user.

32. A method as claimed in claim 31, wherein said step of computing comprises utilizing a heuristic algorithm for solving the problem.

\* \* \* \* \*